US011521516B2

(12) United States Patent
Johnson et al.

(10) Patent No.: US 11,521,516 B2
(45) Date of Patent: Dec. 6, 2022

(54) NUANCE-BASED AUGMENTATION OF SIGN LANGUAGE COMMUNICATION

(71) Applicant: Capital One Services, LLC, McLean, VA (US)

(72) Inventors: Kyle Johnson, McLean, VA (US); Eric Loucks, McLean, VA (US); Gaurang Bhatt, McLean, VA (US); Joshua Edwards, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 389 days.

(21) Appl. No.: 16/875,974

(22) Filed: May 15, 2020

(65) Prior Publication Data

US 2021/0358330 A1 Nov. 18, 2021

(51) Int. Cl.
| | |
|---|---|
| G09G 5/00 | (2006.01) |
| G09B 21/00 | (2006.01) |
| G06N 3/08 | (2006.01) |
| G10L 13/00 | (2006.01) |
| G06V 40/20 | (2022.01) |
| G06N 3/04 | (2006.01) |

(52) U.S. Cl.
CPC .......... *G09B 21/009* (2013.01); *G06N 3/084* (2013.01); *G06V 40/28* (2022.01); *G10L 13/00* (2013.01); *G06N 3/04* (2013.01)

(58) Field of Classification Search
CPC .......... G06N 3/04; G06N 3/084; G06V 40/28; G10L 13/00; G10L 13/033; G09B 21/009
See application file for complete search history.

(56) References Cited

U.S. PATENT DOCUMENTS

2015/0179170 A1* 6/2015 Sarikaya ................. G10L 15/22
704/275
2016/0371703 A1* 12/2016 Mon ...................... H04L 67/148

* cited by examiner

*Primary Examiner* — Insa Sadio
(74) *Attorney, Agent, or Firm* — Perkins Coie LLP

(57) ABSTRACT

In certain embodiments, nuance-based augmentation of gesture may be facilitated. In some embodiments, a video stream depicting sign language gestures of an individual may be obtained via a wearable device associated with a user. A textual translation of the sign language gestures in the video stream may be determined. Emphasis information related to the sign language gestures may be identified based on an intensity of the sign language gestures. One or more display characteristics may be determined based on the emphasis information. The textual translation may be caused to be displayed to the user via the wearable device according to the one or more display characteristics. In some embodiments, a unique voice profile for the individual may be determined. A spoken translation of the sign language gestures may be generated according to the textual translation, the unique voice profile, and the emphasis information.

20 Claims, 5 Drawing Sheets

NUANCE-BASED AUGMENTATION OF SIGN LANGUAGE COMMUNICATION

FIELD OF THE INVENTION

The invention relates to facilitating nuance-based augmentation of gestures, for example, using nuance information to augment interpretation of sign language communication.

BACKGROUND OF THE INVENTION

Advances in computing and software technologies have made it possible for individuals with a language barrier to communicate with each other (e.g., via translation applications). For example, translation applications allow individuals who communicate via sign language to communicate with individuals who do not understand sign language. Despite such advancements, current translation applications are unable to communicate information beyond the basic meanings of sign language gestures. For example, nuances such as emphasis and emotion, which are integral to understanding communication, are lost when using current translation applications. Translations output in generic text or spoken translations lack the nuances and personalization that typically accompany communication. These and other drawbacks exist.

SUMMARY OF THE INVENTION

Aspects of the invention relate to methods, apparatuses, or systems for facilitating nuance-based augmentation of gestures.

In some embodiments, a video stream depicting sign language gestures of an individual may be obtained. In some embodiments, the video stream may be obtained via a user device (e.g., a wearable device) of a user. In some embodiments, a textual translation of the sign language gestures in the video stream may be determined. Emphasis information related to the sign language gestures may be identified based on an intensity of the sign language gestures. For example, the emphasis information may be identified via a machine learning model. In some embodiments, one or more display characteristics may be determined based on the emphasis information, and the textual translation of the sign language gestures may be displayed to the user according to the one or more display characteristics. In some embodiments, a unique voice profile may be determined for the individual, and a spoken translation of the sign language gestures may be generated according to the textual translation, the unique voice profile, and the emphasis information.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
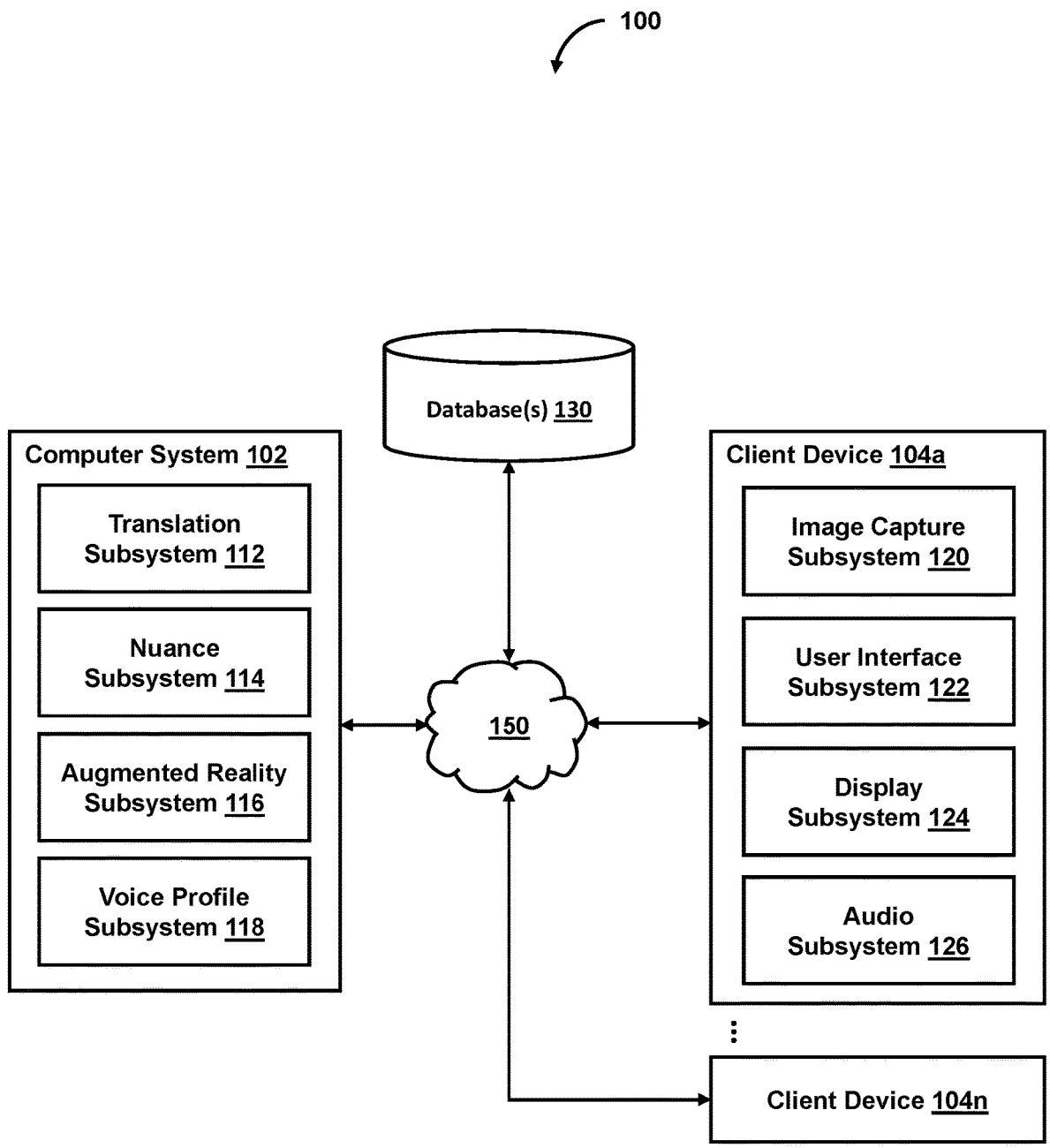
FIG. 1 shows a system for facilitating nuance-based augmentation of gestures, in accordance with one or more embodiments.

FIG. 1 shows a system 100 for facilitating nuance-based augmentation of gestures, in accordance with one or more embodiments. As shown in FIG. 1, system 100 may include computer system 102, client device(s) 104 (or client devices 104a-104n), or other components. Computer system 102 may include translation subsystem 112, nuance subsystem 114, augmented reality subsystem 116, voice profile subsystem 118, or other components. Each client device 104 may include capture subsystem 120, user interface subsystem 122, display subsystem 124, audio subsystem 126, or other components. Each client device 104 may include any type of mobile terminal, fixed terminal, or other device. By way of example, client device(s) 104 may include a desktop computer, a notebook computer, a tablet computer, a smartphone, a wearable device (e.g., augmented reality glasses or goggles), or another client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device(s) 104.

In some embodiments, system 100 may facilitate communication between a user and an individual communicating (e.g., via sign language). System 100 may obtain an image stream of gestures of the individual. In some embodiments, gestures may include sign language gestures, symbolic gestures, deictic gestures, motor gestures, lexical gestures, or other gestures. System 100 may determine a textual translation of the gestures in the image stream. In some embodiments, system 100 may identify emphasis information related to the gestures. For example, emphasis information may be based on an intensity (e.g., speed, vigor, size, repetition, etc.) of the gestures. In some embodiments, system 100 may determine one or more display characteristics (e.g., font size, font color, font style, font type, etc.) based on the emphasis information. System 100 may cause the textual translation to be displayed based on the one or more display characteristics. In some embodiments, system 100 may further determine a unique voice profile for the individual based on attributes (e.g., demographic factors, voice characteristics, or personality) of the individual). System 100 may determine one or more audio characteristics (e.g., volume, tone, pitch, etc.) based on the unique voice profile and the emphasis information. System 100 may then generate a spoken translation of the gestures based on the one or more audio characteristics. System 100 (and all subsystems contained therein) thus provides the user with textual or spoken translations of gestures which incorporate additional information (e.g., emphasis information) for a fuller communication experience.

In some embodiments, system 100 may obtain an image stream or a video stream of gestures of an individual (e.g., via capture subsystem 120 of client device 104). In some embodiments, capture subsystem 120 may comprise a camera or other optical sensor. Capture subsystem 120 may capture one or more images, an image stream, a video stream, a scan, or other types of images. In some embodiments, capture subsystem 120 may comprise communication links to user interface subsystem 122, display subsystem 124, audio subsystem 126, or to other components of system 100 (e.g., via network 150).

In some embodiments, user interface subsystem 122 may be configured to provide an interface between system 100 and the user or other users through which the user or other users may provide information to and receive information from system 100. This enables data, cues, preferences, or instructions and any other communicable items, collectively referred to as "information," to be communicated between the user and the various components of system 100. In some embodiments, user interface subsystem 122 may be or may not be included in a computing device, such as a desktop computer, a laptop computer, a smartphone, a tablet computer, a wearable device, an augmented device, or other computing devices. Such computing devices may run one or more electronic applications having graphical user interfaces configured to provide information to or receive information from users. In some embodiments, user interface subsystem 122 may include or communicate with display subsystem 124. For example, one or more textual translations or other displays may be presented to the user via user interface subsystem 122 or display subsystem 124. In some embodiments, user interface subsystem 122 or display subsystem 124 may include an augmented reality view or display via which an image stream (e.g., as captured by image stream subsystem 120) is displayed. In some embodiments, a translation may be displayed over the image stream in the augmented reality view. In some embodiments, a translation may be displayed proximate the image stream in the augmented reality view. In some embodiments, user interface subsystem 122 or audio subsystem 126 may include an audio interface via which a translation is presented. It should be noted that although capture subsystem 120, user interface subsystem 122, and display subsystem 124 are shown in FIG. 1 within a single client device 104a, this is not intended to be limiting. For example, each subsystem may exist together or separately within one or more client device(s) 104.

In some embodiments, capture subsystem 120 may capture one or more individuals (e.g., one or more people) communicating (e.g., with sign language gestures). For example, capture subsystem 120 may capture sign language gestures of multiple individuals. In some embodiments, all of the individuals communicating may be visible to the user or displayed to the user (e.g., via user interface subsystem 122 or display subsystem 124). In some embodiments, fewer than all of the individuals communicating may be visible or displayed to the user. In this example, capture subsystem 120 may capture all the individuals communicating with the user via sign language gestures (e.g., including those who are not visible or displayed to the user). In some embodiments, capture subsystem 120 may capture all individuals communicating via sign language gestures in the vicinity of the user (i.e., including those who are not communicating directly with the user). In some embodiments, capture subsystem 120 may include multiple cameras in order to capture individuals on multiple sides of the user. In some embodiments, capture subsystem 120 may capture only those individuals who are communicating via sign language gestures directly with the user and who are visible to the user. In some embodiments, client device 104 may send image or video streams captured by capture subsystem 120 to computer system 102 for processing or analysis.

Translation subsystem 112 may receive an image stream or video stream depicting sign language gestures of one or more individuals. In some embodiments, translation subsystem 112 may identify individual gestures within the received image stream or video stream. The individual gestures may correspond to letters, words, names, or other meanings. In some embodiments, translation subsystem 112 may retrieve translations from a database (e.g., database 130). Database 130 may comprise sets of gestures with corresponding translations. For example, a set in the database may comprise an image or video of the sign language gesture for "yellow" along with the translation "yellow."

Figure 2:
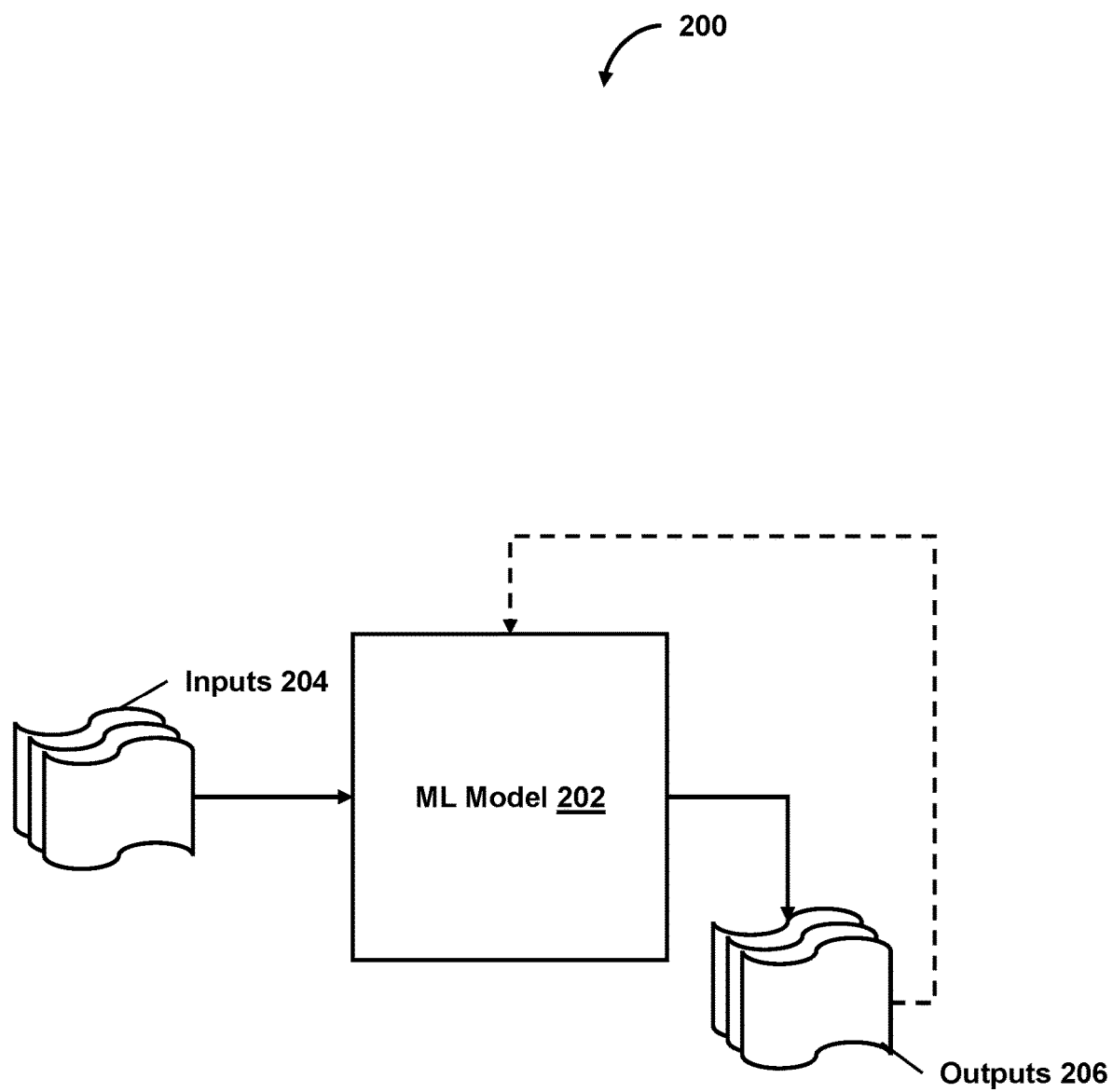
FIG. 2 shows a machine learning model configured to facilitate nuance-based augmentation of gestures, in accordance with one or more embodiments.

In some embodiments, translation subsystem 112 may utilize a machine learning model to translate the gestures captured by capture subsystem 120. FIG. 2 shows a machine learning model 200 configured to facilitate nuance-based augmentation of gestures, in accordance with one or more embodiments. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free flowing, with connections interacting in a more chaotic and complex fashion.

In some embodiments, the prediction model may update its configurations (for example, weights, biases, or other parameters) based on its assessment of the predictions. Database 130 (e.g., as shown in FIG. 1) may include training data and one or more trained prediction models.

As an example, with respect to FIG. 2, machine learning model 202 may take inputs 204 and provide outputs 206. For example, in some embodiments, inputs 204 may comprise training images, image streams, or video streams of sign language gestures. In some embodiments, inputs 204 may include labels for the gestures indicating translations or meanings of the gestures. In this example, outputs 206 may comprise predictions based on the image streams of the sign language gestures. For example, the predictions may comprise translations or meanings of the gestures based on the image streams. Translations or meanings may comprise letters, words, names, or other meanings associated with inputs 204. In one use case, outputs 206 may be fed back (for example, active feedback) to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, translation subsystem 112 may use natural language processing or natural language generation techniques in order to identify words, names, sentences, pauses, and other features of the sign language gestures. For example, translation subsystem 112 may identify a series of letters (e.g., C-A-I-T-Y) as a name (e.g., "Caity"). Translation subsystem 112 may recognize pauses between gestures as transitions between thoughts or sentences or as an intended comma in a sentence. Translation subsystem 112 may identify certain words, names, or phrases as proper nouns and may therefore capitalize those words, names, or phrases. Other methods of natural language generation may be used.

In some embodiments, once translation subsystem 112 has determined translations for the captured sign language gestures, nuance subsystem 114 may determine nuance information relating to the captured sign language gestures. In some embodiments, nuance information may comprise emphasis information, emotion information, or any other type of information captured by capture subsystem 120. For example, nuance subsystem 114 may identify emphasis information based on an intensity with which the sign language gestures are communicated. Intensity may comprise the speed, vigor, size, repetition, or other characteristics with which the sign language gestures are communicated. For example, more intense gestures of an individual (e.g., as indicated by speed, vigor, size, repetition, or other characteristics of the gestures) may indicate that the individual intends to emphasize those gestures.

In some embodiments, nuance subsystem 114 may analyze one or more facial expressions or macro expressions of an individual communicating via sign language gestures. For example, nuance subsystem 114 may analyze micro expressions on the individual's face. Micro expressions may convey information about the individual's emotions, emotional reactions, or other emotion information. Micro expressions, macro expressions, and other facial expressions may be used by nuance subsystem 114 to determine emotion information relating to the individual's sign language gestures. For example, nuance subsystem 114 may determine that an individual is smiling while gesturing but that the captured micro expressions indicate nervousness. Nuance subsystem 114 may determine emotion information for the individual based on these factors or other factors.

In some embodiments, nuance subsystem 114 may analyze body language of the individual. For example, nuance subsystem 114 may capture and analyze body language of the individual (e.g., posture, eye contact, direction of focus, hand movement, and other details) during communication, before communication, or after communication. In some embodiments, nuance subsystem 114 may determine emphasis information, emotion information, or both based on the body language of the individual. In some embodiments, nuance subsystem 114 may analyze information about the individual holistically in order to determine emphasis and emotion information. For example, nuance subsystem 114 may use a combination of facial expressions and body language to determine emotion information. In another example, nuance subsystem 114 may use a combination of intensity of gestures and other body language in order to determine emphasis information.

In some embodiments, individuals may communicate via sign language gestures with characteristics that are specific to them. For example, a first person may gesture more intensely (e.g., more quickly, more vigorously, using larger gestures, more repetitively, etc.) on average than a second person. Nuance subsystem 114 may recognize that the first person gestures more intensely in general (i.e., the first person does not intend to emphasize every gesture). Therefore, nuance subsystem 114 may determine gesture intensity for the first person in relation to a different (i.e., higher) baseline level from the second person. In some embodiments, nuance subsystem 114 may determine different baseline scores for various measures of intensity of sign language gestures (e.g., speed, vigor, size, etc.). For example, nuance subsystem 114 may determine a score for various intensity measures for each sign language gesture on a scale (e.g., 1 to 5, low to high, or some other scale).

In some embodiments, resting facial expressions may differ between individuals. For example, a first person may have a resting facial expression that resembles a frown while a second person has a more neutral resting facial expression. Nuance subsystem 114 may recognize that the first person has a particular resting facial expression (i.e., and that the first person is not always expressing sadness). In this example, nuance subsystem 114 may recognize different baseline facial expressions for different individuals.

In some embodiments, nuance subsystem 114 may utilize a machine learning model or neural network in order to identify nuance information. As an example, with respect to FIG. 2, inputs 204 may comprise training images, image streams, or video streams of sign language gestures. In some embodiments, inputs 204 may include labels for the gestures indicating emphasis information relating to the gestures. In some embodiments, inputs 204 may comprise training images, image streams, or video streams of facial expressions, macro expressions, or micro expressions. Inputs 204 may include labels for the facial expressions or micro expressions indicating emotion information. In this example, outputs 206 may comprise predictions based on the image streams of the sign language gestures or the facial expressions. For example, the predictions (i.e., outputs 206) may comprise predicted emphasis information or predicted emotion information based on the training images or videos. In one use case, outputs 206 may be fed back (for example, active feedback) to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information).

In some embodiments, nuance subsystem 114 may store nuance information associated with certain individuals, for example, in profiles associated with those individuals. For example, computer system 102 may create and store profiles for certain individuals who communicate frequently with the user. In some embodiments, the profile may comprise identifying information for the individual, nuance information associated with the individual, and other information associated with the individual. In some embodiments, computer system 102 may determine an interaction frequency of an individual with the user and, if the interaction frequency satisfies a threshold, computer system 102 may store the individual's profile (e.g., in storage, as described in detail below). In some embodiments, computer system 102 may monitor an interaction frequency between the individual and the user over time. If the interaction frequency falls below a threshold, computer system 102 may remove the individual's profile from storage. In some embodiments, the user may override the default settings for storing or deleting profiles from storage. For example, the user may encounter a friend infrequently (e.g., below an interaction frequency threshold) but may still wish to keep the friend's profile in storage. The user may configure each profile with unique storage or deletion settings or may customize default storage or deletion settings.

In some embodiments, nuance subsystem 114 may monitor emphasis information and emotion information associated with individuals over time and may update the corresponding profiles accordingly. For example, nuance subsystem 114 may recognize habits, facial expressions, gesture characteristics, or other tendencies that develop or decrease in an individual over time. In this way, nuance subsystem 114 may maintain an updated "normal" or baseline level (e.g., relating to emphasis information, emotion information, and other information) for each profile. In some embodiments, individuals for whom computer system 102 does not have an associated profile stored may be compared to "normal" levels based on averages of accumulated data. For example, in order to determine if a new person is exhibiting emotion information, nuance subsystem 114 may compare facial expressions of the new person to average or common facial expressions based on accumulated data. In some embodiments, the average or common facial expressions may be based upon all individuals with whom the user has interacted. In some embodiments, the average or common facial expressions may be based upon facial expressions stored in a database (e.g., database 130).

In some embodiments, augmented reality subsystem 116 may generate for display textual translations of sign language gestures (e.g., captured by capture subsystem 120). The textual translations may be retrieved from translation subsystem 112. In some embodiments, the textual translations may be displayed via user interface subsystem 122 or display subsystem 124. In some embodiments, the textual translations may be superimposed on one or more images. For example, the textual translations may be superimposed on top of the image stream, for example, so that the translation appears near an individual as they are gesturing. In some embodiments, a textual translation may be displayed with an image or identifier of the corresponding person.

In some embodiments, augmented reality subsystem 116 may retrieve nuance information (e.g., emphasis information, emotion information, or other information) from nuance subsystem 114. In some embodiments, augmented reality subsystem 116 may use the nuance information to determine one or more display characteristics. Display characteristics may include font size, font color, font style, or font type (i.e., of the textual translations). For example, gestures that are emphasized by the individual (e.g., communicated with vigor) may be displayed in larger text, a different color, bold text, italic text, underlined text, capitalized text, a different font style, or with some other characteristic. In some embodiments, display characteristics may correspond to emotion information. For example, if an individual appears to be angry, the text may be displayed in red or in a bold font. In some embodiments, the display characteristics may be pre-programmed. For example, font size, font color, font style, or font type and corresponding emphasis information or emotion information may be pre-programmed. In some embodiments, the display characteristics may be customizable by the user. For example, the user may specify (e.g., via user interface subsystem 122) that textual translations corresponding to emphasized gestures should be displayed in larger font or that textual translations corresponding to sad emotions should be displayed in blue text. In some embodiments, a text box or text "bubble" surrounding the textual translation may also have certain display characteristics. For example, the text box may have different shapes, colors, outlines, backgrounds, or other characteristics.

In some embodiments, display characteristics may include icons or images. For example, augmented reality subsystem 116 may cause emojis (e.g., corresponding to the emotion information), contact photos (e.g., corresponding to an individual's profile), or other icons or images to be displayed. In some embodiments, augmented reality subsystem 116 may superimpose the icons or images onto the textual translations, onto text boxes surrounding the textual translations, onto the individual depicted in the image stream, or in another location. In some embodiments, textual translations may be replaced with icons or images. For example, if a textual translation identifies another person (e.g., a friend), augmented reality subsystem 116 may replace the textual translation (or a portion of the textual translation) with an image (e.g., contact photo) of the friend. In another example, if a textual translation identifies an emotion (e.g., "I'm so excited!"), augmented reality subsystem 116 may replace the textual translation (or a portion of the textual translation) with an icon or image corresponding to the emotion (e.g., an emoji showing excitement or an image of the individual appearing excited). In some embodiments, augmented reality subsystem 116 may insert icons or images to indicate spatial information of various individuals communicating in the vicinity of the user. For example, if an individual out of view of the user is communicating with the user, augmented reality subsystem 116 may cause an arrow indicating a direction of the individual relative to the user's field of view to be displayed.

In some embodiments, the display characteristics, as described above, may be based upon an individual's profile information (e.g., as stored by computer system 102). For example, certain display characteristics may be unique to the individual. A text box shape or color may be unique to a certain stored profile (e.g., so that it is easily recognizable to the user). In some embodiments, display characteristics may be customized by the user for the profile (e.g., via user interface subsystem 122). For example, the user may set display characteristics (e.g., corresponding to emphasis information or emotion information) that are different from default display characteristics. In some embodiments, display characteristics (e.g., fonts, text boxes, icons, and other display characteristics) may be unique to each profile. In this example, textual translations may be identified as corresponding to a specific person without requiring additional identifying information.

Figure 3:
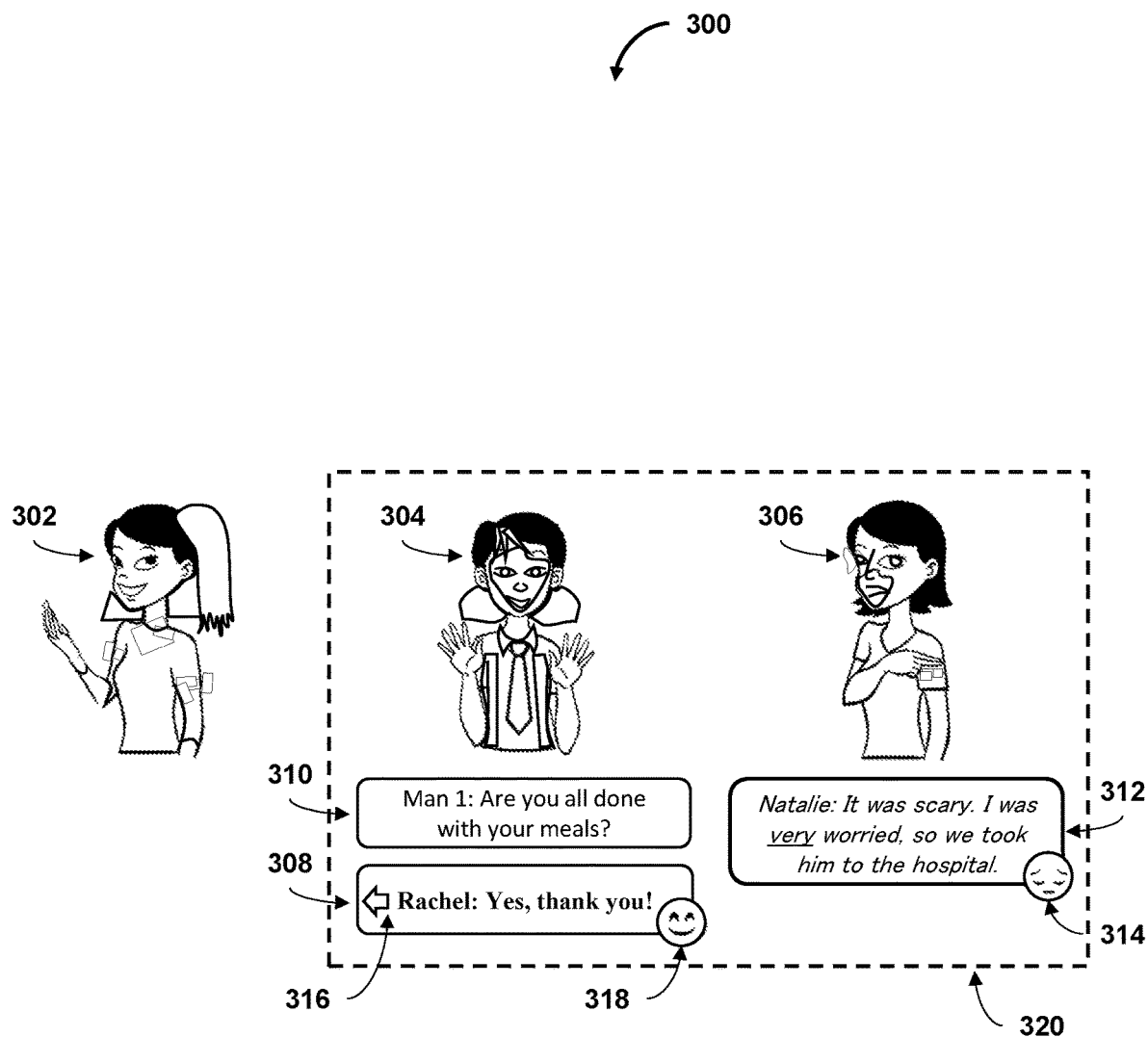
FIG. 3 shows a system for facilitating nuance-based augmentation of gestures with textual translations, in accordance with one or more embodiments.

FIG. 3 shows a system 300 for facilitating nuance-based augmentation of gestures with textual translations, in accordance with one or more embodiments. As shown in FIG. 3, the textual translations may be displayed according to one or more display characteristics, as described above. FIG. 3 shows three individuals communicating via sign language gestures (e.g., person 302, person 304, and person 306). In this example, person 302 is not visible or displayed to the user. For example, person 302 may be outside of the field of view 320. In some embodiments, field of view 320 may be a field of view shown in a display (e.g., display subsystem 124). In some embodiments, field of view 320 may be a field of view visible to the user. Although person 302 is outside of field of view 320, person 302 may still be captured by capture subsystem 120. In some embodiments, textual translation 308 may correspond to gestures of person 302, textual translation 310 may correspond to gestures of person 304, and textual translation 312 may correspond to gestures of person 306. In some embodiments, textual translations 308, 310, and 312 may include identifiers, such as contact images, names, descriptions, or other identifiers. In some embodiments, identifiers may be determined based on the sign language gestures (e.g., if the individual communicated a name), based on an input from the user (e.g., via user interface subsystem 122), or based on some other information. For example, textual translation 308 includes the identifier "Rachel." In some embodiments, textual translation 308 may correspond to a saved profile having the identifier "Rachel." Textual translation 310 may correspond to a new person (e.g., someone with whom the user has not interacted with before). Therefore textual translation 310 is marked with the identifier "Man 1." In some embodiments, a textual translation corresponding to a new person (or an individual for whom no stored profile exists) may be identified with a descriptive identifier (e.g., "Person 1," "New 2," "Colleague," etc.). Textual translation 312 includes the identifier "Natalie" and may correspond to a saved profile having the identifier "Natalie."

As shown in FIG. 3, textual translations 308, 310, and 312 are displayed according to various display characteristics. For example, textual translation 308 is displayed in a first font with a bold font style. Textual translation 308 is additionally displayed with a text box having a dotted background. In some embodiments, the first font, the bold font style, or the text box style may be based on a profile associated with person 302, nuance information (e.g., retrieved from nuance subsystem 114), customization by the user (e.g., via user interface subsystem 122), or other factors. Textual translation 308 includes icon 316 and icon 318. In this example, icon 316 may indicate that person 302 is outside of field of view 320 and may indicate a location of person 302 (e.g., relative to field of view 320). In some embodiments, different fonts, text boxes, icons, and other display characteristics may be used to identify individuals who are outside of the field of view of the user (e.g., field of view 320). Icon 318 may correspond to emotion information conveyed by person 302 (e.g., determined by nuance subsystem 114). For example, icon 318 may indicate that person 302 appeared happy or friendly as person 302 communicated (e.g., based on facial expressions, macro expressions, or micro expressions of person 302).

Textual translation 310 is displayed in a second font and in a standard font style (e.g., without bold, italics, capitalization, etc.). In some embodiments, the lack of display characteristics may indicate that the sign language gestures were made minimal emphasis or emotion. For example, person 304 may have communicated in a neutral manner. Computer system 102 may store a profile for person 304 in temporary storage. In some embodiments, computer system 102 may monitor an interaction frequency between the user and person 304. If the interaction frequency satisfies a threshold, computer system 102 may save the profile for person 304. If the interaction frequency does not satisfy the threshold, computer system 102 may discard the profile for person 304.

Textual translation 312 is displayed in a third font with an italic font style. Textual translation 312 is additionally displayed in a text box having a thick outline. In some embodiments, the third font, the italic font style, or the text box style may be based on a profile associated with person 306, nuance information (e.g., retrieved from nuance subsystem 114), customization by the user (e.g., via user interface subsystem 122), or other factors. As shown in FIG. 3, one word of textual translation 312 is underlined. The underlining of the word "very" may indicate that person 306 has emphasized that word when communicating via sign language gestures (e.g., based on an intensity of the corresponding gesture). Textual translation 312 includes icon 314, which may correspond to emotion information conveyed by person 306 (e.g., determined by nuance subsystem 114). For example, icon 314 may indicate that person 306 appeared sad or upset as person 306 communicated (e.g., based on facial expressions, macro expressions, or micro expressions of person 306).

Returning to FIG. 1, voice profile subsystem 118 may determine a unique voice profile for an individual communicating via sign language gestures. In some embodiments, the unique voice profile may be added to a profile already associated with the individual or may be created via voice profile subsystem 118. In some embodiments, the unique voice profile for the individual may be based upon demographic factors, voice characteristics, or personality of the individual. For example, demographic factors may include age, sex, origin, background, or other attributes of the individual. Voice characteristics of the individual may include features of the individual's voice, for example, if the individual speaks while communicating via sign language gestures. These features may include volume, speed, pitch, (e.g., tone, intonation, etc.) or other features of the individual's voice (e.g., accent, dialect, pattern, or other features). In some embodiments, personality of the individual may include information based on the individual's demeanor, body language, voice characteristics, and other factors. In some embodiments, personality may include emphasis information and emotion information. In some embodiments, personality may include friendliness, approachability, agreeability, hostility, sociability, and other personality traits. In some embodiments, other factors may be used to determine the unique voice profile.

In some embodiments, voice profile subsystem 118 may create each unique voice profile using a variety of audio characteristics. For example, audio characteristics of each voice profile may include volume, speed, pitch, gender, accent, dialect, pattern, tone, intonation, and other audio characteristics. In some embodiments, voice profile subsystem 118 may use a score or scale for each audio characteristic. For example, volume, speed, pitch, and tone may each be measured on a scale of zero to ten. Gender and accent characteristics may each have several selectable options or a scale. In some embodiments, voice profile subsystem 118 may select settings for each audio characteristic of a unique voice profile for an individual. As described above, the settings for the audio characteristics may be based upon demographic factors of the individual, voice characteristics of the individual, or other factors. In some embodiments, audio characteristics may be customizable by the user. For example, the user may create a unique voice profile by selecting or adjusting settings for various audio characteristics (e.g., via user interface subsystem 122). In some embodiments, other methods of determining audio characteristics for the unique voice profile may be used (e.g., audio characteristics may be randomized to create unique voice profiles).

In some embodiments, the audio characteristics used to determine a unique voice profile for an individual may be based upon emphasis information for the individual. For example, speed, vigor, size, and other emphasis information relating to sign language gestures of the individual can be used to determine a unique voice profile that mimics the individual's emphasis decisions when communicating. In addition, other features relating to the individual's communication style when communicating via sign language gestures may be used to determine the unique voice profile for the individual. In some embodiments, emphasis information may be used for the unique voice profile or for temporary adjustments to the unique voice profile. For example, if emphasis information determined by nuance subsystem 114 applies to a single conversation or certain words or sentences between a user and the individual, then audio characteristics based on the emphasis information may apply to spoken translations associated with that conversation or those words or sentences. For example, if the individual emphasizes a word (e.g., as evidenced by increased vigor of the associated gestures), voice profile subsystem 118 may temporarily raise a volume associated with the unique voice profile of the individual for the duration of the spoken translation of the statement. For example, as shown in FIG. 3, the word "very" in textual translation 312 has been emphasized by person 306. In this example, a spoken translation of this statement may output the word "very" at a higher volume than the rest of the translation. In other examples, emphasis information for an individual may influence the unique voice profile of the individual for longer durations of time.

In some embodiments, the audio characteristics used to determine a unique voice profile for an individual may be based upon emotion information for the individual. For example, as discussed above, computer system 102 (e.g., nuance subsystem 114) may analyze micro expressions on the individual's face. Micro expressions may convey information about the individual's emotions, emotional reactions, or other emotion information. Micro expressions and other facial expressions may be used by nuance subsystem 114 to determine emotion information relating to the individual's sign language gestures. For example, nuance subsystem 114 may determine that an individual is exhibiting a first emotion while gesturing but that the captured micro expressions indicate a second emotion. Nuance subsystem 114 may determine emotion information for the individual based on captured emotions or other factors. In some embodiments, the voice profile subsystem 118 may determine audio characteristics for the unique voice profile based on the emotion information identified by nuance subsystem 114. For example, voice profile subsystem 118 may select audio characteristics which are associated with the emotion information (e.g., excitement may be associated with higher pitches). In some embodiments, emotion information may be used for the unique voice profile or for temporary adjustments to the unique voice profile. For example, if emotion information determined by nuance subsystem 114 applies to a single conversation or certain words or sentences between a user and the individual, then audio characteristics based on the emotion information may apply to spoken translations associated with that conversation or those words or sentences. For example, if the individual exhibits higher levels of excitement during the conversation than normal, voice profile subsystem 118 may temporarily raise a pitch associated with the unique voice profile of the individual for the duration of the conversation. In other examples, emotion information for an individual may influence the unique voice profile of the individual for longer or shorter durations of time.

In some embodiments, computer system 102 may create and store unique voice profiles for certain individuals who communicate frequently with the user. For example, computer system 102 may determine an interaction frequency of an individual with the user and, if the interaction frequency satisfies a threshold, computer system 102 may store the individual's unique voice profiles (e.g., in storage, as described in detail below). In some embodiments, computer system 102 may store the individual's unique voice profile in connection with a profile already in existence that is associated with the individual (e.g., relating to emphasis information or emotion information for the individual). In some embodiments, computer system 102 may monitor an interaction frequency between the individual and the user over time. If the interaction frequency falls below a threshold, computer system 102 may remove the individual's unique voice profile from storage. In some embodiments, a profile may comprise identifying information for the individual, nuance information associated with the individual, a unique voice profile for the individual, and other information associated with the individual.

In some embodiments, voice profile subsystem 118 may determine "normal" or baseline audio characteristics for an individual, which may be stored in a unique voice profile associated with the individual. For each spoken translation of the individual, voice profile subsystem 118 may output the spoken translation of the individual according to audio characteristics stored in the unique voice profile as well as audio characteristics that are based on nuances of the specific conversation. For example, voice profile subsystem 118 may retrieve audio characteristics for the individual (e.g., typical volume, speed, pitch, tone, intonation, etc.) from the unique voice profile associated with the individual. Voice profile subsystem 118 may then retrieve emphasis information, emotion information, and other information from nuance subsystem 114. Voice profile subsystem 118 may then adjust the audio characteristics for the spoken translation (or a portion of the spoken translation) based on the information retrieved from nuance subsystem 114. In this way, voice profile subsystem 118 may output a spoken translation that aligns with the unique voice profile and typical communication style of the individual while also accounting for nuances of the conversation (e.g., if the individual emphasizes certain words or becomes emotional for a portion of the conversation).

Voice profile subsystem 118 may ensure that the audio characteristics are not identical for any two unique voice profiles. The distinctness of each unique voice profile may allow differentiation between spoken translations during communication via sign language gestures, for example, in a group setting. In some embodiments, if voice profile subsystem 118 adjusts audio characteristics temporarily to account for changes in emphasis information or emotion information, voice profile subsystem 118 may ensure that the temporary audio characteristics of a unique voice profile are not identical to another unique voice profile.

In some embodiments, computer system 102 (e.g., using translation subsystem 112 or voice profile subsystem 118) may generate a spoken translation of the sign language gestures for the individual according to the unique voice profile of the individual. For example, translation subsystem 112 may generate a spoken translation of sign language gestures of the individual based on the sign language gestures. In some embodiments, translation subsystem 112 may generate a spoken translation of the sign language gestures of the individual based on the textual translation of the sign language gestures (e.g., using text to speech methods). In some embodiments, the spoken translation may be generated according to the unique user profile (e.g., using the audio characteristics determined by voice profile subsystem 118, as discussed above). In some embodiments, the spoken translation may be generated for the user or other individuals via audio subsystem 126. For example, audio subsystem 126 may comprise a personal audio system (e.g., headphones, speakers, or other audio systems.). In some embodiments, the spoken translation may be output to a group of individuals. For example, audio subsystem 126 may comprise an audio system that can be heard by individuals in the vicinity of the user or in the vicinity of client device 104.

Figure 4:
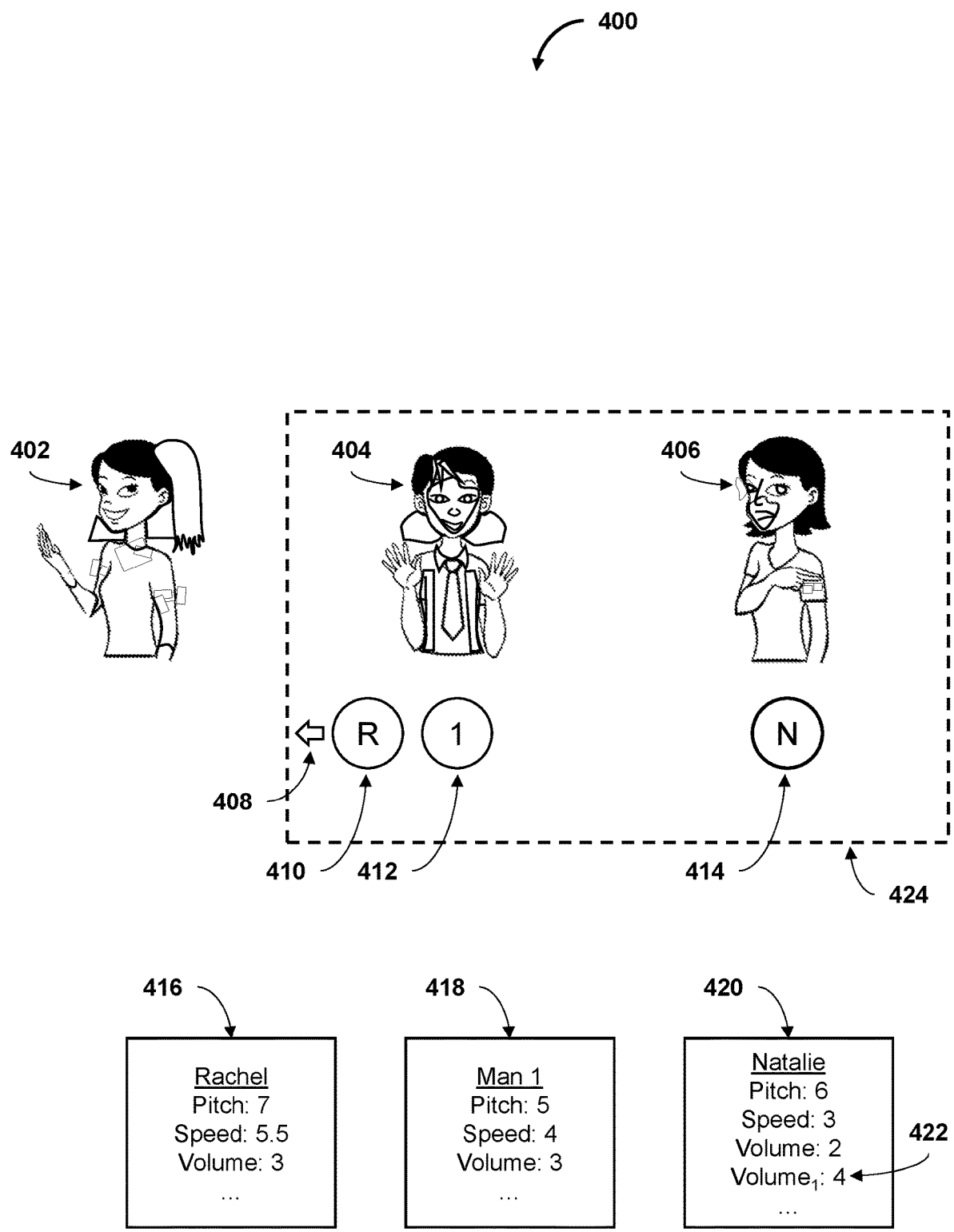
FIG. 4 shows a system for facilitating nuance-based augmentation of gestures with spoken translations, in accordance with one or more embodiments.

FIG. 4 shows a system 400 for facilitating nuance-based augmentation of gestures with spoken translations, in accordance with one or more embodiments. As shown in FIG. 4, person 402, person 404, and person 406 are communicating via sign language gestures. In some embodiments, person 402, person 404, and person 406 may correspond to person 302, person 304, and person 306, as shown in FIG. 3. In some embodiments, computer system 102 (e.g., augmented reality subsystem 116) may superimpose identifiers corresponding to person 402, person 404, and person 406 (e.g., on field of view 424). In some embodiments, the identifiers may be a text box having a name or initial corresponding to the individual (e.g., as shown in FIG. 4). Identifier 410 may display "R," corresponding to "Rachel," in a text box that has been customized for person 402 (e.g., with dots). Icon 408 may be an arrow, as shown in FIG. 4, to indicate that person 402 is not captured in field of view 424 and to indicate a location of person 402 relative to field of view 424. Identifier 412 may display the number "1," corresponding to an unknown or new person. Identifier 414 may display "N," corresponding to "Natalie," in a text box that has been customized for person 406 (e.g., with a thick outline).

In some embodiments, voice profile 416 may correspond to person 402. For example, voice profile 416 may have audio characteristics (e.g., pitch, speed, volume, and other audio characteristics) that have been determined (e.g., by voice profile subsystem 118) for person 402 based on demographic factors, voice characteristics, personality, emphasis information, emotion information, and other factors. Voice profile 418 may correspond to person 404 and may have audio characteristics that have been determined for person 404. In some embodiments, person 404 may be new (e.g., the user has not interacted with person 404 in the past), and so the audio characteristics stored in voice profile 418 may be new as well (e.g., based on the present conversation). In some embodiments, voice profile 418 may be stored in temporary storage (e.g., for the duration of the interaction with person 404, until a threshold amount of time has passed, or for some other duration of time).

Voice profile 420 may correspond to person 406 and may have audio characteristics that have been determined for person 406. Voice profile 420 may comprise a general volume as well as an adjusted volume 422 (e.g., "Volume$_1$"). In some embodiments, the adjusted volume may correspond to a particular gesture, word, translation, conversation, or other element of the conversation. For example, as shown in FIG. 3, person 306 may have emphasized the sign language gesture corresponding to the word "very." Therefore, nuance subsystem 114 may identify emphasis information relating to the word "very" and, based on the emphasis information, voice profile subsystem 118 may assign adjusted volume to the spoken translation of the emphasized gesture. In this example, voice profile subsystem 118 may assign a higher volume (e.g., volume 4, as compared to an overall volume of 2) to the spoken translation of "very" within voice profile 420. In some embodiments, other audio characteristics may be assigned to words, phrases, sentences, or conversations having associated emphasis or emotion information.

In some embodiments, spoken translations for person 402, person 404, or person 406 may include additional information. For example, the spoken translations may include identifying information about the individual. The spoken translation associated with person 404, for example, may be "Man 1 says: Are you all done with your meals?" In some embodiments, the spoken translations may include information about a location of an individual, for example, if the individual is not visible to the user or if the individual is not captured in field of view 424. For example, the spoken translation associated with person 402 may be "To your left, Rachel says: Yes, thank you!" In some embodiments, the spoken translations may be generated (e.g., via audio subsystem 126) in the order in which individuals communicate the gestures. In some embodiments, the spoken translations may be generated according to conversation order. For example, if the gestures of person 402 (e.g., Rachel) are in response to the gestures of person 404 (e.g., Man 1), audio subsystem 126 may output the spoken translation associated with person 402 directly after the spoken translations of person 404, regardless of whether another person (e.g., person 406) communicates in the interim. Spoken translations of gestures not involved in the conversation between person 402 and person 404 may be output after the conversation between person 402 and person 404 has concluded. In some embodiments, other methods for determining an order in which to generate the spoken translations may be used.

Figure 5:
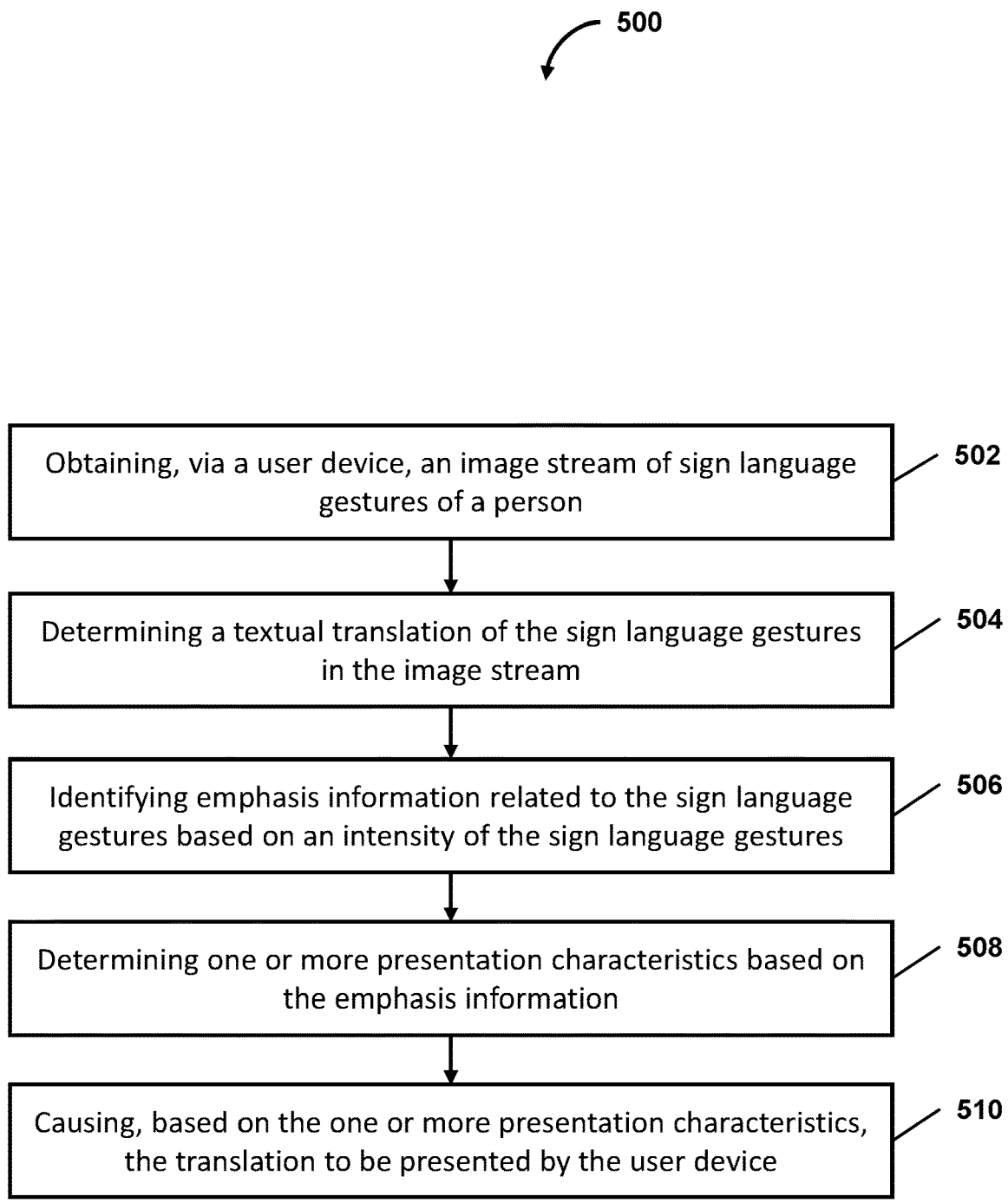
FIG. 5 shows a flowchart of a method of facilitating nuance-based augmentation of gestures, in accordance with one or more embodiments.

FIG. 5 is an example flowchart of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 5 shows a flowchart 500 of a method of facilitating nuance-based augmentation of gestures, in accordance with one or more embodiments. In an operation 502, an image stream of sign language gestures of an individual may be obtained. In some embodiments, the image stream may be obtained via a user device. Operation 502 may be performed by a subsystem that is the same as or similar to capture subsystem 120, in accordance with one or more embodiments. In an operation 504, a textual translation of the sign language gestures in the image stream may be determined. Operation 504 may be performed by a subsystem that is the same as or similar to translation subsystem 112, in accordance with one or more embodiments.

In an operation 506, emphasis information related to the sign language gestures may be identified based on an intensity of the sign language gestures. In some embodiments, intensity of the sign language gestures may include speed, vigor, or size of the sign language gestures. Operation 506 may be performed by a subsystem that is the same as or similar to nuance subsystem 114, in accordance with one or more embodiments. In an operation 508, one or more presentation characteristics may be determined based on the emphasis information. In some embodiments, the one or more presentation characteristics may include font size, font color, font style, font type, volume, speed, pitch (e.g., tone, intonation, etc.), or other characteristics. Operation 508 may be performed by a subsystem that is the same as or similar to augmented reality subsystem 116 or voice profile subsystem 118, in accordance with one or more embodiments.

In an operation 510, based on the one or more presentation characteristics, the translation may be caused to be presented. In some embodiments, the translation may be presented by the user device. Operation 510 may be performed by a subsystem that is the same as or similar to display subsystem 124 or audio subsystem 126, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 130 or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical-charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118, subsystems 120-126, and/or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 and subsystems 120-126 described herein is for illustrative purposes, and is not intended to be limiting, as any of subsystems 112-118 or subsystems 120-126 may provide more or less functionality than is described. For example, one or more of subsystems 112-118 or subsystems 120-126 may be eliminated, and some or all of its functionality may be provided by other ones of subsystems 112-118 or subsystems 120-126. As another example, additional subsystems may be programmed to perform some or all of the functionality attributed herein to one of subsystems 112-118 or subsystems 120-126.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining, via a user device of a user, an image stream of one or more gestures of an individual; determining a translation of the one or more gestures in the image stream; identifying emphasis information related to the one or more gestures based on an intensity of the one or more gestures; determining one or more presentation characteristics based on the emphasis information; and causing, based on the one or more presentation characteristics, the textual translation to be presented via a user interface of the user device.
2. The method of embodiment 1, wherein the intensity of the one or more gestures comprises speed, vigor, or size of the one or more gestures.
3. The method of any of embodiments 1-2, wherein the one or more presentation characteristics comprise size, color, style, type (e.g., font size, font color, font style, etc., when the translation comprises a textual translation), volume, speed, pitch, tone, or intonation.
4. The method of any of embodiments 1-3, further comprising identifying emotion information based on one or more facial expressions of the individual, and wherein the one or more presentation characteristics are further based on the emotion information.
5. The method of any of embodiments 1-4, further comprising causing an identifier associated with the individual to be displayed with the translation on the user interface.
6. The method of any of embodiments 1-5, further comprising: identifying, in the image stream, second one or more gestures of a second person; and causing an identifier associated with the second person to be displayed with a second translation of the second one or more gestures on the user interface.
7. The method of any of embodiments 1-6, further comprising: determining a unique voice profile for the individual based on attributes of the individual; determining one or more audio characteristics based on the unique voice profile and the emphasis information; and generate, based on the one or more audio characteristics, a spoken translation of the one or more gestures via the user device.
8. The method of embodiment 7, wherein the attributes of the individual comprise demographic factors, voice characteristics, or personality of the individual.
9. The method of embodiment 7, wherein the one or more audio characteristics comprise volume, speed, pitch, accent, dialect, or pattern.
10. The method of embodiment 7, further comprising: determining, based on an interaction history of the user, an interaction frequency between the user and the individual; determining whether the interaction frequency satisfies a threshold; and in response to determining that the interaction frequency satisfies the threshold, storing the unique voice profile with an identifier associated with the individual.
11. The method of embodiment 7, further comprising identifying emotion information based on one or more facial expressions of the individual, and wherein the one or more audio characteristics are further based on the emotion information.
12. The method of any of embodiments 1-11, wherein the one or more gestures comprises one or more sign language gestures, symbolic gestures, deictic gestures, motor gestures, or lexical gestures.
13. The method of any of embodiments 1-12, wherein the user interface comprises an augmented reality view in which the image stream is displayed.
14. The method of embodiment 13, wherein the translation is displayed over the image stream in the augmented reality view.
15. The method of embodiment 13, wherein the translation is displayed proximate the image stream in the augmented reality view.
16. The method of any of embodiments 1-15, wherein the user interface comprises an audio interface via which the translation is presented.
17. A tangible, non-transitory, machine-readable medium storing instructions that, when executed by a data processing apparatus, causes the data processing apparatus to perform operations comprising those of any of embodiments 1-16.
18. A system comprising: one or more processors; and memory storing instructions that, when executed by the processors, cause the processors to effectuate operations comprising those of any of embodiments 1-16.

What is claimed is:

1. A system for facilitating nuance-based augmentation of gestures, the system comprising:
   a computer system that comprises one or more processors programmed with computer program instructions that, when executed, cause the computer system to:
   obtain, via a wearable device associated with a user, a video stream depicting sign language gestures of a person;
   determine a textual translation of the sign language gestures in the video stream;
   identify emphasis information related to the sign language gestures based on an intensity of the sign language gestures;
   determine one or more display characteristics based on the emphasis information;
   cause, via the wearable device, the textual translation of the sign language gestures to be displayed to the user according to the one or more display characteristics;
   determine a unique voice profile for the person; and
   generate a spoken translation of the sign language gestures according to the textual translation, the unique voice profile, and the emphasis information.

2. The system of claim 1, wherein the computer system is further caused to:
   provide a training video depicting a sign language gesture as input to a machine learning model to cause the machine learning model to generate a predicted emphasis of the sign language gesture;
   obtain feedback indicating an emphasis of the sign language gesture; and
   provide the feedback as reference feedback to the machine learning model to cause the machine learning model to assess the feedback against the predicted emphasis, the machine learning model being updated based on the assessment of the feedback,
   wherein to identify the emphasis information, the computer system is caused to use the updated machine learning model to identify the emphasis information.

3. The system of claim 1, wherein the unique voice profile is determined based on demographic factors or voice characteristics of the person.

4. A method being implemented by one or more processors executing computer program instructions that, when executed, perform the method, the method comprising:
   obtaining, via a user device of a user, an image stream of sign language gestures of a person;

determining a textual translation of the sign language gestures in the image stream;
identifying emphasis information related to the sign language gestures based on an intensity of the sign language gestures;
determining one or more display characteristics based on the emphasis information; and
causing, based on the one or more display characteristics, the textual translation to be displayed on a graphical user interface of the user device.

5. The method of claim 4, wherein the intensity of the sign language gestures comprises speed, vigor, or size of the sign language gestures.

6. The method of claim 4, wherein the one or more display characteristics comprise font size, font color, font style, or font type.

7. The method of claim 4, further comprising identifying emotion information based on one or more facial expressions of the person, and wherein the one or more display characteristics are further based on the emotion information.

8. The method of claim 4, further comprising:
identifying, in the image stream, second sign language gestures of a second person; and
causing an identifier associated with the second person to be displayed with a second textual translation of the second sign language gestures on the graphical user interface.

9. The method of claim 4, further comprising:
determining a unique voice profile for the person based on attributes of the person;
determining one or more audio characteristics based on the unique voice profile and the emphasis information; and
generate, based on the one or more audio characteristics, a spoken translation of the sign language gestures via the user device.

10. The method of claim 9, wherein the attributes of the person comprise demographic factors or voice characteristics of the person.

11. The method of claim 9, wherein the one or more audio characteristics comprise volume, speed, or pitch.

12. The method of claim 9, further comprising:
determining, based on an interaction history of the user, an interaction frequency between the user and the person;
determining whether the interaction frequency satisfies a threshold; and
in response to determining that the interaction frequency satisfies the threshold, storing the unique voice profile with an identifier associated with the person.

13. The method of claim 9, further comprising identifying emotion information based on one or more facial expressions of the person, and wherein the one or more audio characteristics are further based on the emotion information.

14. One or more non-transitory, computer-readable media having instructions that, when executed by one or more processors, cause operations comprising:
obtaining, via a user device of a user, an image stream of gestures of a person;
determining a translation of the gestures in the image stream;
identifying emphasis information related to the gestures based on an intensity of the gestures;
determining one or more presentation characteristics based on the emphasis information; and
causing, based on the one or more presentation characteristics, the translation to be presented via the user device.

15. The one or more non-transitory, computer-readable media of claim 14, wherein the intensity of the gestures comprises speed, vigor, or size of the gestures.

16. The one or more non-transitory, computer-readable media of claim 14, wherein the one or more presentation characteristics comprise font size, font color, font style, font type, volume, speed, or pitch.

17. The one or more non-transitory, computer-readable media of claim 14, further comprising identifying emotion information based on one or more facial expressions of the person, and wherein the one or more presentation characteristics are further based on the emotion information.

18. The one or more non-transitory, computer-readable media of claim 14, further comprising:
identifying, in the image stream, second gestures of a second person; and
causing an identifier associated with the second person to be presented by the user device with a second translation of the second gestures.

19. The one or more non-transitory, computer-readable media of claim 14, wherein the one or more presentation characteristics are further based on demographic factors or voice characteristics of the person.

20. The one or more non-transitory, computer-readable media of claim 19, further comprising:
determining, based on an interaction history of the user, an interaction frequency between the user and the person;
determining whether the interaction frequency satisfies a threshold; and
in response to determining that the interaction frequency satisfies the threshold, storing a profile with an identifier associated with the person and the demographic factors or the voice characteristics of the person.

* * * * *